United States Patent
Lashley et al.

(10) Patent No.: US 7,092,513 B1
(45) Date of Patent: Aug. 15, 2006

(54) LIMITING MAXIMUM GAIN IN DUPLEX COMMUNICATIONS DEVICES INCLUDING TELEPHONE SETS

(75) Inventors: David G. Lashley, Cartersville, GA (US); Robert L. Doss, Jr., Ringgold, GA (US); John Pilozzi, Stow, MA (US)

(73) Assignee: Plantronics, Inc., Santa Cruz, CA (US)

( * ) Notice: Subject to any disclaimer, the term of this patent is extended or adjusted under 35 U.S.C. 154(b) by 15 days.

(21) Appl. No.: 10/882,720

(22) Filed: Jul. 1, 2004

(51) Int. Cl.
*H04M 9/08* (2006.01)

(52) U.S. Cl. .............................. 379/388.03; 379/390.03

(58) Field of Classification Search .......... 379/388.03, 379/388.06, 388.07, 390.01, 390.03, 391; 381/375
See application file for complete search history.

(56) References Cited

U.S. PATENT DOCUMENTS

| | | | | |
|---|---|---|---|---|
| 5,612,996 A | * | 3/1997 | Li ......................... | 379/390.03 |
| 5,867,573 A | * | 2/1999 | Wittman ................ | 379/388.07 |
| 6,477,250 B1 | * | 11/2002 | Sheets .................... | 379/394 |
| 7,006,624 B1 | * | 2/2006 | Philipsson et al. ..... | 379/388.03 |
| 2002/0090078 A1 | * | 7/2002 | Feltstrom et al. ...... | 379/390.01 |
| 2004/0240664 A1 | * | 12/2004 | Freed .................... | 379/406.01 |

* cited by examiner

*Primary Examiner*—Daniel Swerdlow
(74) *Attorney, Agent, or Firm*—Jung-hua Kuo (57) ABSTRACT

Duplex communication methods and systems with maximum gain limiting such as in telephone handsets and speaker phones are disclosed. The communications system such as a telephone set may generally include a digital signal processor (DSP) having a receive and transmit path in communication with a receiver and a transmitter, respectively, a volume amplifier for amplifying signals on the receive path, and a maximum gain limiter for determining a total return loss between the receive and transmit paths and for limiting a volume amplification level of the volume amplifier to a maximum depending on the total return loss. The maximum gain limiter determines the total return loss by maintaining a total loop gain for the telephone set at less than 0 dB to prevent unstable operation and howling.

40 Claims, 4 Drawing Sheets

LIMITING MAXIMUM GAIN IN DUPLEX COMMUNICATIONS DEVICES INCLUDING TELEPHONE SETS

BACKGROUND OF THE INVENTION

1. Field of the Invention

The present invention relates generally to communication devices. More specifically, duplex communication methods and systems with maximum gain limiting such as in telephone handsets and speaker phones are disclosed.

2. Description of Related Art

A telephone transmitter (microphone) into which a person talks converts speech, i.e., acoustical energy, into variations in an electric current, i.e., electrical energy, by varying or modulating the loop current in accordance with the speech of the talker. On the other hand, telephone receiver (speaker) converts electrical current variations into sound that the person can hear.

A small amount of the transmitter signal is fed back into the receiver, called the sidetone, as a form of feedback mechanism. In other words, sidetone is the portion of the talker's voice that is fed back to the talker's receiver. Sidetone allows the person to hear his/her own voice through the receiver to help the person determine how loudly to speak. Sidetone should be at a proper level because too much sidetone may cause the person to speak too softly for good reception by the other party while too little sidetone may cause the person to speak too loudly that it may sound like a yell at the receiving end.

Receiver gain may be applied to facilitate the user in hearing the receiver output. For example, amplified telephones for hearing impaired users and speakerphones often employ receiver gain to facilitate the user in hearing the receiver output. Although various anti-sidetone circuits are often employed to minimize feedback and to reduce transmission of acoustical noise, in general no more than 30 dB of receiver gain (over nominal) can be provided because of feedback between the transmitter (microphone) and the receiver (speaker) that result in howling. This howling is similar to when a microphone is placed too close to a public address system speaker. However, 30 dB of gain is generally insufficient to allow the a user with moderate to severe hearing loss to adequately hear the receiver output on the telephone. Other amplified telephone sets may employ a line echo canceller (LEC) and an acoustic echo canceller (AEC) in order to achieve gains of more than 30 dB. However, the maximum amount of gain that can be achieved without unstable operation or howling may vary depending on the actual conditions under which the telephone set is utilized, e.g., the local loop to which the telephone set is connected, etc. Conventional amplified telephone sets are generally designed to take into account the worst case scenario and limits the maximum amount of gain applied by the telephone set accordingly. Thus, the maximum amount of gain that the amplified telephone set can apply is often be lower than what can actually be applied while preventing unstable operation or howling.

Thus it would be desirable to maximize or increase the receiver gain without generating feedback that results in howling.

SUMMARY OF THE INVENTION

Duplex communication methods and systems with maximum gain limiting such as in telephone handsets and speaker phones are disclosed. It should be appreciated that the present invention can be implemented in numerous ways, including as a process, an apparatus, a system, a device, or a method. Several inventive embodiments of the present invention are described below.

The communications system such as a telephone set may generally include a digital signal processor (DSP) having a receive and transmit path in communication with a receiver and a transmitter, respectively, a volume amplifier for amplifying signals on the receive path, and a maximum gain limiter for determining a total return loss between the receive and transmit paths and for limiting a volume amplification level of the volume amplifier to a maximum depending on the total return loss. The total return loss generally refers to the loss through a hybrid and a line echo canceller (LEC) of the telephone set. The maximum gain limiter determines the total return loss by maintaining a total loop gain for the telephone set at less than 0 dB to prevent unstable operation and howling.

The total return loss may be determined based on a comparison between powers of signals on the transmit and receive paths such as during a telephone call when a far end is silent and the transmit path is active. The total return loss may be determined during each telephone call and/or during a first telephone call after the telephone set is first powered up. Alternatively or additionally, the total return loss may be determined by comparing the power of signals on the receive path with the power of a test signal injected in the transmit path prior to a telephone call when the telephone set is off-hook and by filtering out a dial tone on the receive path. The total return loss may be determined each time the telephone set is off-hook and/or the first time the telephone set is off-hook after the telephone set is powered up.

The telephone set may also include a sidetone processor configured to inject additional sidetone in the receive path depending on the total return loss, a predetermined minimum sidetone level, and/or a user volume level setting. For example, the sidetone processor may inject additional sidetone only when the total return loss is greater than a predetermined maximum total return loss. The sidetone processor and the maximum gain limiter maintain a total loop gain for the telephone set at less than 0 dB.

According to another embodiment, a communications device such as a telephone set may generally include a receiver in communication with a receive path, a transmitter in communication with a transmit path, a volume amplifier for amplifying signals on the receive path at a volume amplification level, and a maximum gain limiter for determining a total return loss between the receive and transmit paths and for limiting the volume amplification level to a maximum depending on the total return loss.

According to yet another embodiment, a method for maximizing amount of gain that can be applied to received signal of a duplex communications device such as a telephone set without exceeding a total loop gain for the telephone set of 0 dB may generally include measuring a total return loss between a receive and a transmit path of a digital signal processor of the telephone set, automatically determining a maximum volume gain for a volume amplifier for amplifying signals at a volume amplification level on the receive path, the determining being dependent on the total return loss and performed by the digital signal processor, and limiting the volume amplification level to be applied by the volume amplifier on the receive path of the telephone set to the maximum volume gain.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Duplex communication methods and systems with maximum gain limiting such as in telephone handsets and speaker phones are disclosed. Although a telephone set with speakerphone, handset or headset is illustrated and described herein by way of example, various other personal communication devices with duplex may be implemented with the systems and methods as described herein. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
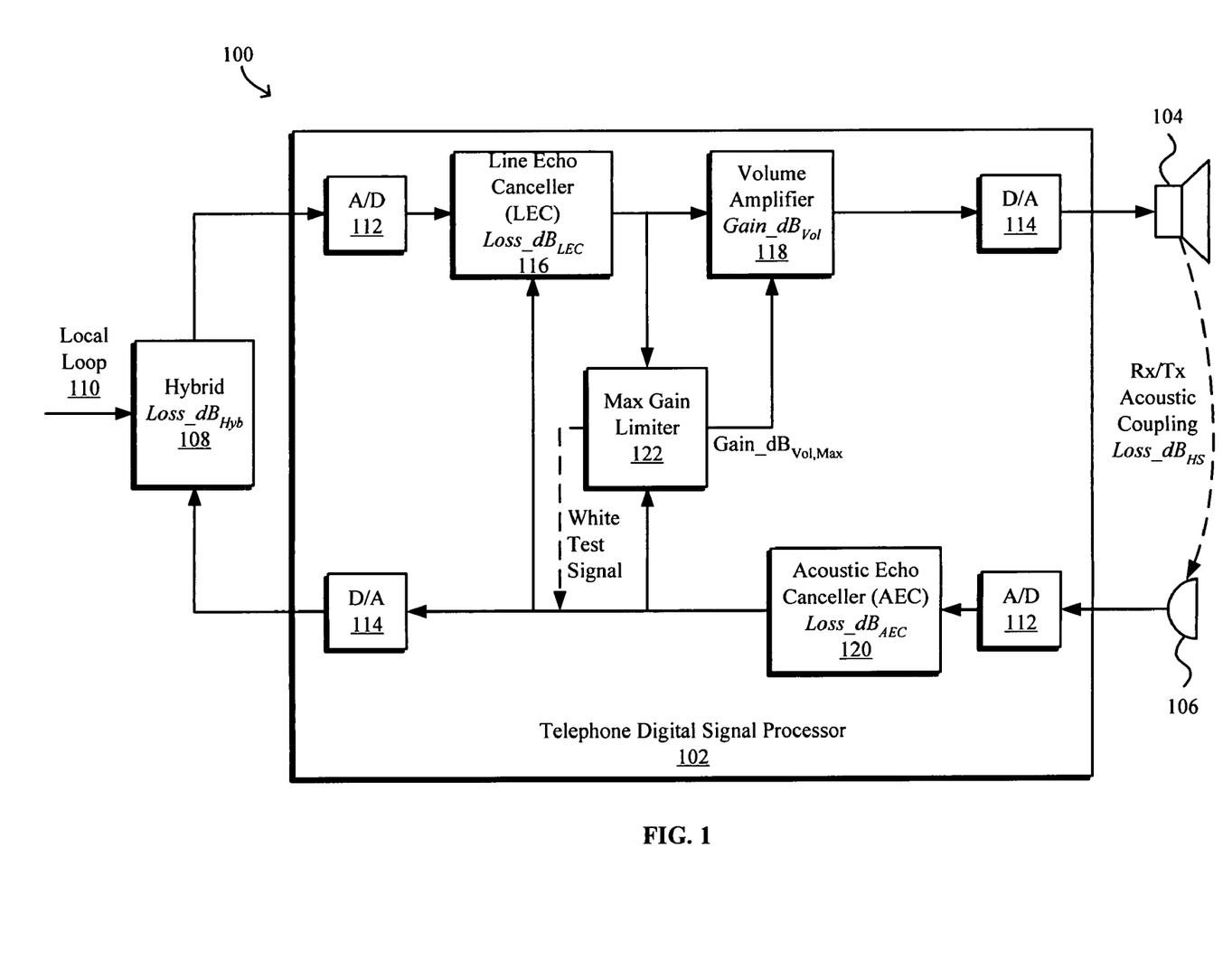
FIG. 1 is a block diagram of a communications system such as a telephone with speakerphone implemented with maximum gain limiting.

FIG. 1 is a block diagram of a telephone set 100 such as one with speakerphone implemented with maximum gain limiting. The telephone set automatically limits the maximum gain or amplification on the volume to ensure that howling does not occur for a particular telephone line connection based on certain performance parameters. The telephone set 100 generally includes a telephone digital signal processor (DSP) 102 in communication with a telephone receiver or speaker 104 for converting a received electrical signal into a corresponding sound and a transmitter or microphone 106 for converting a transmitted sound into a corresponding electrical signal. A hybrid 108 or hybrid matching circuit interfaces between the digital signal processor 102 of the telephone set 100 and a local loop 110 in communication with a central office (not shown) of the telephone service provider. The hybrid is sometimes referred to as a two-to-four wire converter for coupling the four wires of the telephone set 100 to two wires of the local loop 110.

The digital signal processor 102 typically includes codecs such as analog to digital (A/D) and digital to analog (D/A) converters 112, 114 for converting analog signals received as input from the hybrid 108 and the transmitter/microphone 106 to digital signals for digital processing as well as for converting the processed digital signals to analog signals for output to the hybrid 108 and the receiver/speaker 104, respectively. The A/D and D/A converters 112, 114 may be internal to the digital signal processor 102, as shown, or may be separate components digitally connected to the digital signal processor 102. The digital signal processor 102 also includes a volume amplifier 118 that amplifies signals for output to the telephone receiver 104. The level of amplification of the volume amplifier 118, $\text{Gain\_dB}_{Vol}$, may be adjusted by the user based on, for example, the noise environment in which the telephone set 100 is utilized, the level or the user's hearing loss, if any, and/or the general amplitude of the far end received signal.

The total loop gain of a conventional telephone set, i.e., without echo cancellers, is a function of the acoustic coupling loss between the receiver/speaker 104 and the transmitter/microphone 106, $\text{Loss\_dB}_{HS}$, and the loss through the hybrid 108, $\text{Loss\_dB}_{Hyb}$. As is well known, an acoustic path exists between the receiver/speaker 104 and the transmitter/microphone 106 by which a portion of the acoustic output signal produced by the receiver 104 is coupled onto the acoustic signal input of the transmitter 106 as an acoustic echo signal. The acoustic echo signal typically does not pose a problem in conventional telephone sets as the amount of the acoustic signal fed back to the transmitter is sufficiently low to preclude the total loop gain in the conventional telephone set from exceeding unity, i.e., 0 dB. However, in speakerphones such as the telephone set 100 shown in FIG. 1 as well as amplified telephones that incorporate substantial amplification of the received signal, e.g., by means of the volume amplifier 118, the acoustic echo can result in unstable operation or howling in the telephone set 100 when the gain added to the receive signal is sufficiently high to cause the total loop gain in the telephone set 100 to exceed 0 dB.

Echo cancellers are often employed in highly amplified speaker telephones and full-duplex telephones to reduce or minimize the total loop gain of the telephone set and thus prevent howling or feedback. As shown in FIG. 1, the digital signal processor 102 includes a hybrid or line echo canceller (LEC) 116 and a handset or acoustic echo canceller (AEC) 120. As is well known, a portion of the signal transmitted by the transmitter 106 is reflected back as a line echo superimposed on the receive signal. The hybrid or line echo canceller 116 may thus be employed to increase the effective total return loss through the hybrid 108 by $\text{Loss\_dB}_{LEC}$ (in dB). In addition, the handset or acoustic echo canceller 120 may be employed to increase the effective loss of the handset, i.e., between the receiver/speaker 104 and the transmitter/microphone 106, by $\text{Loss\_dB}_{AEC}$ (in dB).

To prevent howling or feedback, the total telephone loop gain $\text{Gain\_dB}_{Loop}$ is preferably maintained at less than 0 dB. The total telephone loop gain $\text{Gain\_dB}_{Loop}$, may be expressed as:

$$\text{Gain\_dB}_{Loop} = \text{Gain\_dB}_{Vol} - \text{Loss\_dB}_{HS} - \text{Loss\_dB}_{AEC} - \text{Loss\_dB}_{Hyb} - \text{Loss\_dB}_{LEC}$$

where $\text{Gain\_dB}_{Vol}$ is the volume amplification level set by the user. Thus, to ensure that no howling occurs, the maximum volume amplification $\text{Gain\_dB}_{Vol,Max}$ that may be set by the user should be:

$$\text{Gain\_dB}_{Vol,Max} < (\text{Loss\_dB}_{HS} + \text{Loss\_dB}_{AEC}) + (\text{Loss\_dB}_{Hyb} + \text{Loss\_dB}_{LEC}) \quad \text{(EQ. 1)}$$

Although the total coupling loss (Loss_dB$_{HS}$+Loss_dB$_{AEC}$) is dependent on the telephone set and thus may be determined at the time of manufacture, the performance of the LEC 116 and the hybrid 108, i.e., the total return loss (Loss_dB$_{LEC}$+Loss_dB$_{Hyb}$), depends on the actual telephone line or local loop 110 to which the telephone set 100 is connected and thus is unknown at the time of manufacture. In particular, the performance of the LEC 116 and the hybrid 108 is typically related to various physical parameters such as the length of the local loop 110, various non-linear effects, etc. and thus varies depending on the particular connection or local loop 110 to which the telephone set 100 is connected.

To achieve a total loop gain of less than 0 dB, the digital signal processor 102 employs a maximum gain limiter 122 to automatically adapt and limit the maximum amplification or gain applied by the volume amplifier 118 and thus the maximum volume based on the estimated performance of the LEC 116 and the hybrid 108. Specifically, to prevent howling, the maximum gain limiter 122 sets the maximum volume gain Gain_dB$_{Vol,Max}$ of the volume amplifier 118 based on the total return loss (Loss_dB$_{LEC}$+Loss_dB$_{Hyb}$) which can be determined in the field based on the actual connection of the telephone set 100.

Estimation of the performance of the LEC 116 and the hybrid 108, i.e., the total return loss (Loss_dB$_{LEC}$+Loss_dB$_{Hyb}$) may be made on a per-call basis and/or during an initial power-up or setup sequence of the telephone set 100. For example, the maximum gain limiter 122 may determine the total return loss (Loss_dB$_{LEC}$+Loss_dB$_{Hyb}$) during normal conversation when the far end is silent and the near end, i.e., the transmitter/microphone 106, is active by comparing the power measured at the output of the LEC 116 with the power measured at the output of the AEC 120. Alternatively or additionally, the maximum gain limiter 122 may inject a white test signal in the transmit path at the output of the AEC 120 for a short time each time or the first time the telephone set 100 is powered up and the telephone set 100 goes off hook. The maximum gain limiter 122 may then determine the total return loss (Loss_dB$_{LEC}$+Loss_dB$_{Hyb}$) by filtering out the dial tone for measurement purposes and then comparing the power as measured at the output of the LEC 116 with the known power of the white test signal injected into the transmit path.

As the total coupling loss (Loss_dB$_{HS}$+Loss_dB$_{AEC}$) is dependent on the telephone set and thus is known at the time of manufacture, the maximum gain limiter 122 may then determine the maximum allowable volume gain Gain_dB$_{Vol,Max}$ by maintaining the total telephone loop gain Gain_dB$_{Loop}$ at less than 0 dB, i.e., by satisfying (EQ. 1) above. For example, where the total return loss (Loss_dB$_{LEC}$+Loss_dB$_{Hyb}$) for the particular local loop 110 to which the telephone set 100 is connected is high, the maximum allowable volume gain Gain_dB$_{Vol,Max}$ can be similarly high while satisfying (EQ. 1) above. Similarly, where the total return loss (Loss_dB$_{LEC}$+Loss_dB$_{Hyb}$) for the particular local loop 110 to which the telephone set 100 is connected is low, the maximum allowable volume gain Gain_dB$_{Vol,Max}$ should be similarly low in order to satisfy (EQ. 1) above. Thus the sound processing capabilities of the telephone digital signal processor 102 allow the telephone set 100 to attain the highest volume gain Gain_dB$_{Vol}$ for a particular local loop 110 or connection while preventing or minimizing feedback or howling. The telephone digital signal processor 102 thus achieves the highest volume gain Gain_dB$_{Vol}$ for the particular local loop 110 to which the telephone set is connected without having to unnecessarily assume the worst case minimum total return loss scenario and thus without having to unnecessarily limit the highest volume gain to a low Gain_dB$_{Vol,Max}$.

Figure 2:
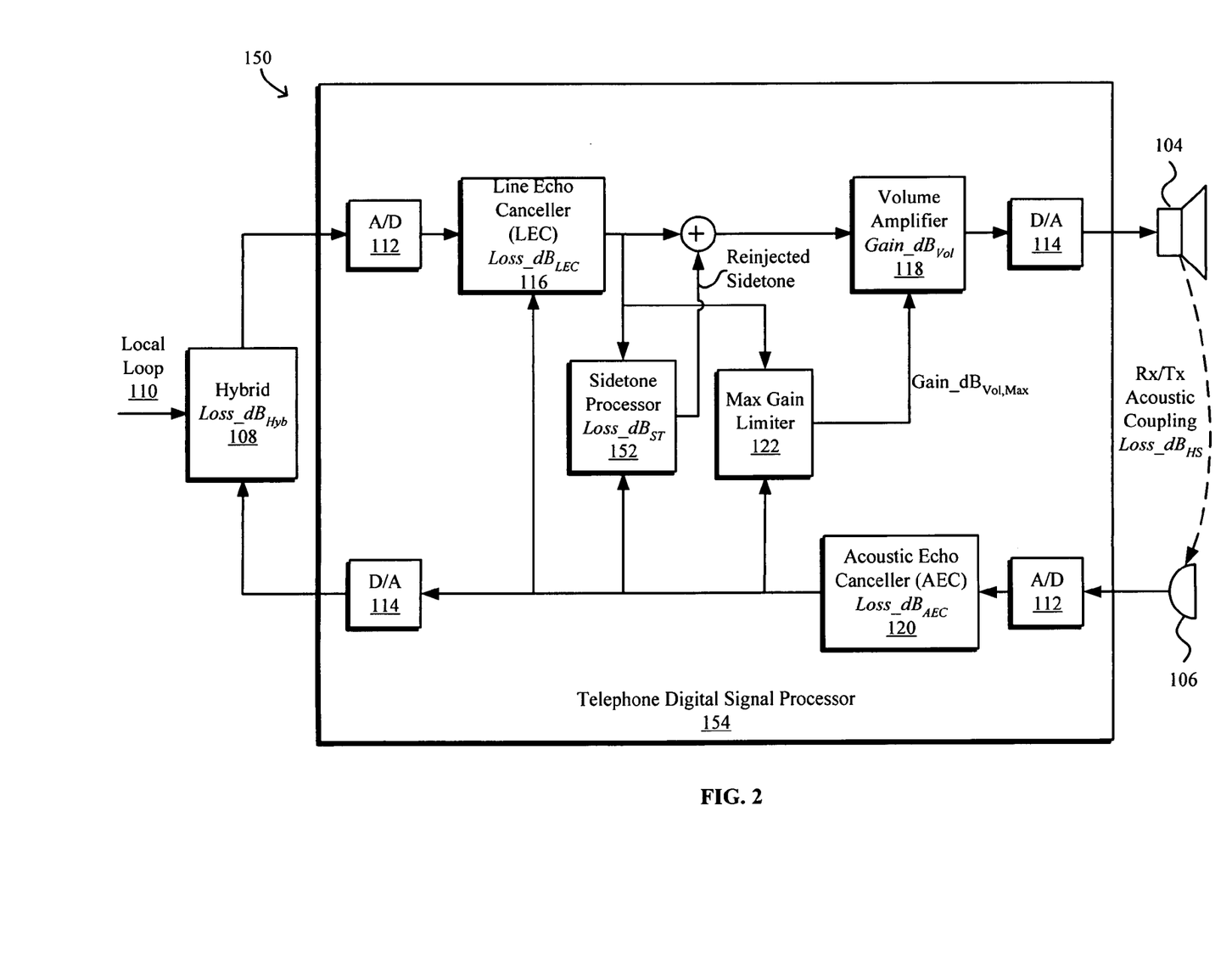
FIG. 2 is a block diagram of a communications system such as an amplified handset or headset telephone implemented with sidetone and maximum gain limiting.

The telephone set 100 as shown in FIG. 1 is generally applicable to duplex amplified telephone sets such as speakerphones. However, for a highly amplified telephone set using a handset or headset such as one for hearing impaired users, sidetone may also be adapted such as by re-injecting additional sidetone in the receive path so as to maintain a minimum level of sidetone for perceptual reasons. In particular, FIG. 2 is a block diagram of an alternative amplified telephone set 150 with a handset or headset and implemented with maximum gain limiting as well as adapted sidetone level.

In addition to limiting the maximum volume gain to prevent howling similar to the mechanism as described above with reference to FIG. 1, it may be desirable to maintain a minimum level of sidetone level that is dependent on the total return loss (Loss_dB$_{LEC}$+Loss_dB$_{Hyb}$). In particular, when the total return loss (Loss_dB$_{LEC}$+Loss_dB$_{Hyb}$) exceeds a predetermined maximum total return loss level, additional sidetone can be re-injected in the receive path though a separate digital path, e.g., via a sidetone processor 152. The level of sidetone to re-inject as represented by Loss-dB$_{ST}$ can be determined by the sidetone processor 152 based on the total return loss (Loss_dB$_{LEC}$+Loss_dB$_{Hyb}$). It is noted that although the various functional components of the digital signal processor are shown separately, any suitable combination of components may be physically integrated into a single component. For example, the maximum gain limiter 122 and the sidetone processor 152 may be integrated as a single component.

To prevent howling or feedback, the total telephone loop gain Gain_dB$_{Loop}$ is preferably maintained at less than 0 dB. The total telephone loop gain Gain_dB$_{Loop}$ for the telephone set 150 may be expressed as:

$$\text{Gain\_dB}_{Loop} = \text{Gain\_dB}_{Vol} - \text{Loss\_dB}_{HS} - \text{Loss\_dB}_{AEC} - \text{Loss\_dB}_{ST} - \text{Loss\_dB}_{Comb}$$

where Loss_dB$_{Comb}$ is the combined loss in dB of the LEC 116, the hybrid 108, and the sidetone as re-injected by the sidetone processor 152 and is given by:

$$\text{Loss\_dB}_{Comb} = -20 \log_{10}\left(10^{\frac{\text{Loss\_dB}_{HYB} + \text{Loss\_dB}_{LEC}}{20}} + 10^{\frac{\text{Loss\_dB}}{20}}\right)$$

Thus to ensure that no howling occurs, the maximum volume amplification Gain_dB$_{Vol,Max}$ should be maintained as:

$$\text{Gain\_dB}_{Vol,Max} < (\text{Loss\_dB}_{HS} + \text{Loss-dB}_{AEC}) + \text{Loss\_dB}_{Comb} \quad \text{(EQ. 2)}$$

As noted above, the total coupling loss (Loss_dB$_{HS}$+Loss_dB$_{AEC}$) is dependent on the telephone set and is known at the time of manufacture. On the other hand, the total return loss (Loss_dB$_{LEC}$+Loss_dB$_{Hyb}$) varies depending on the actual telephone line or local loop 110 to which the telephone set 150 is connected and can be measured or estimated in the field based on the actual connection of the telephone set 150. Thus, the digital signal processor 154 prevents howling by automatically adapting and setting both the maximum volume gain Gain_dB$_{Vol,Max}$ for the volume amplifier 118 and the sidetone level Loss_dB$_{ST}$ re-injected by the sidetone processor 152 based on the measured or estimated total return loss (Loss_dB$_{LEC}$+Loss_dB$_{Hyb}$) and by satisfying (EQ. 2) above. As there are two variables Gain_dB$_{Vol,Max}$ and Loss_dB$_{ST}$ and only one equation (EQ. 2), the digital signal processor 154 may also automatically adapt and set the two variables based on the user's volume setting of the telephone set 150, perceptual considerations, e.g., to maintain a minimum level of sidetone when the total return loss (Loss_dB$_{LEC}$+Loss_dB$_{Hyb}$) exceeds a predetermined maximum level and/or a user sidetone-volume setting that allows the user to select a preference of either achieving a minimum level of sidetone or achieving greater volume amplification in situations where the volume gain can be increased only if the injected sidetone is reduced. The user sidetone-volume setting may be a selection between minimum sidetone or maximum volume gain or may be a setting between the two preferences.

Specifically, where the total return loss (Loss_dB$_{LEC}$+Loss_dB$_{Hyb}$) is at or below the predetermined maximum level, the sidetone processor 152 would not re-inject additional sidetone into the receive path, i.e., Loss_dB$_{ST}$ would not contribute to Loss_dB$_{Comb}$. and (EQ. 2) would simply become (EQ. 1). The maximum gain limiter 122 would then set the maximum volume gain Gain_dB$_{Vol,Max}$ for the volume amplifier 118 by satisfying (EQ. 1) above. For example, where the total return loss (Loss_dB$_{LEC}$+Loss_dB$_{Hyb}$) for the particular local loop 110 to which the telephone set 150 is connected is low, the maximum allowable volume gain Gain_dB$_{Vol,Max}$ should also be set low in order to satisfy (EQ. 2) above.

Alternatively, where the total return loss (Loss-dB$_{LEC}$+Loss_dB$_{Hyb}$) for the particular local loop 110 to which the telephone set 150 is connected is greater than the predetermined maximum level, the sidetone processor 152 may automatically adapt and set a level of additional sidetone Loss_dB$_{ST}$ to re-inject into the receive path. The determination of the level of additional sidetone Loss_dB$_{ST}$ to re-inject may be based at least in part on the user's volume setting an/or on attempting to maintain a minimum level of sidetone while satisfying (EQ. 2) above. For example, where the user has set the volume amplifier to a low setting and the total return loss exceeds the predetermined maximum level, the sidetone processor 152 may re-inject a relatively high level of additional sidetone into the receive path (i.e., low Loss_dB$_{ST}$) while satisfying (EQ. 2) and the minimum sidetone level. As another example, where the user has set the volume amplifier to a maximum setting, e.g., a level limited to Gain_dB$_{Vol,Max}$, and the total return loss exceeds the predetermined maximum level, the level of the re-injected sidetone may be reduced (i.e., Loss_dB$_{ST}$ increased) so as to achieve a desired volume gain level set by the user without howling effects such that the minimum sidetone level may not be achieved under such circumstances. As noted above, a user sidetone-volume setting may be provided to enable the user to choose or select between (1) achieving the maximum volume amplification at the expense of not necessarily achieving the minimum sidetone level or (2) achieving the minimum sidetone level at the expense of possibly constraining the maximum volume amplification. In other words, at the former sidetone-volume setting, the telephone set may apply an algorithm that limits the maximum volume gain based on the total return loss without regard to the sidetone level such that the level of sidetone to be re-injected, if any, is only that which is permitted depending on the total loop gain. At the latter sidetone-volume setting, the telephone set may apply an algorithm that reinjects the necessary level of sidetone to maintain the minimum sidetone level and then sets the maximum volume gain dependent on the total loop gain taking into account the reinjected sidetone. The user sidetone-volume setting may either allow the user to select either of the two settings or a level between the two settings. Because the telephone set 150 adapts both the maximum volume amplification Gain_dB$_{Vol,Max}$ and the level of re-injected sidetone Loss_dB$_{ST}$ depending on the total return loss while preventing howling, the amplified telephone set 150 is better suited to meet the individual hearing needs of users with varying degrees of hearing loss.

Figure 3:
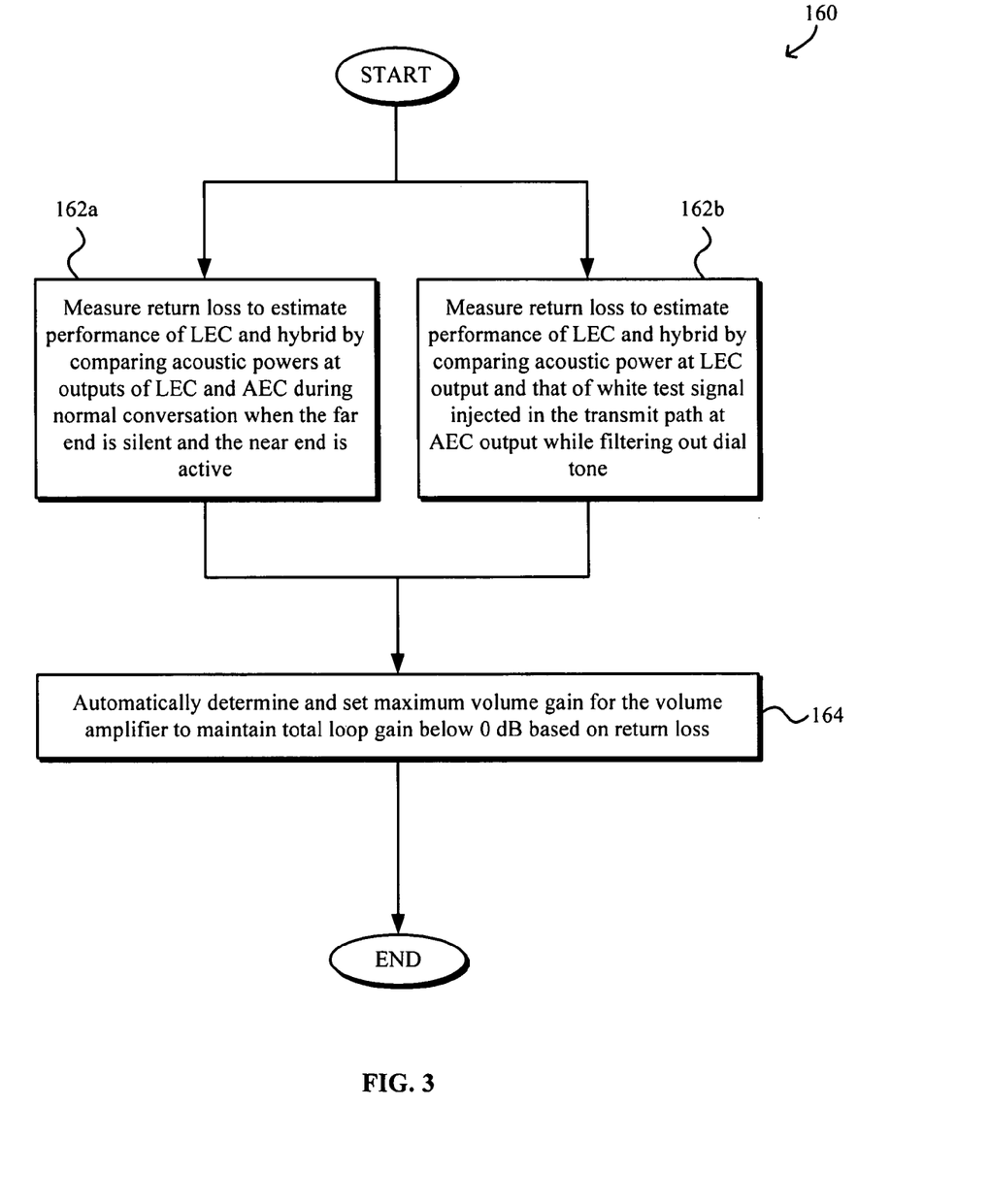
FIG. 3 is a flowchart illustrating a process for limiting the maximum gain in a telephone handset or speakerphone.

FIG. 3 is a flowchart illustrating a process 160 for limiting the maximum gain in an amplified telephone set such as a speakerphone. At block 162, the maximum gain limiter of the telephone set's digital signal processor measures the total return loss (Loss_dB$_{Hyb}$+Loss_dB$_{LEC}$) to estimate the performance of the LEC and the hybrid. The maximum gain limiter may perform block 162 on a per-call basis and/or during an initial power-up or setup sequence of the telephone set. In particular, as shown at block 162a, the maximum gain limiter may determine the total return loss by comparing the powers measured at the outputs of the LEC and the AEC during normal conversation when the far end is silent and the near end, i.e., the transmitter/microphone, is active. Alternatively or additionally, as shown at block 162b, the maximum gain limiter may inject a white test signal in the transmit path at the output of the AEC for a short time each time or the first time the telephone set is powered up and the telephone set goes off hook. The maximum gain limiter may then determine the total return loss by filtering out the dial tone for measurement purposes and comparing the power measured at the output of the LEC with the known power of the white test signal injected into the transmit path. At block 164, the maximum gain limiter automatically determines and sets the maximum volume gain Gain_dB$_{Vol,Max}$ for the volume amplifier based on the estimated performance of the LEC and the hybrid as determined at block 162 so that the total loop gain in the telephone set is maintained at below 0 dB to prevent unstable operation and howling. The maximum volume gain Gain_dB$_{Vol,Max}$ may then be used as the volume gain applied by the volume amplifier when the user sets the volume amplification on the maximum setting at block 166.

Figure 4:
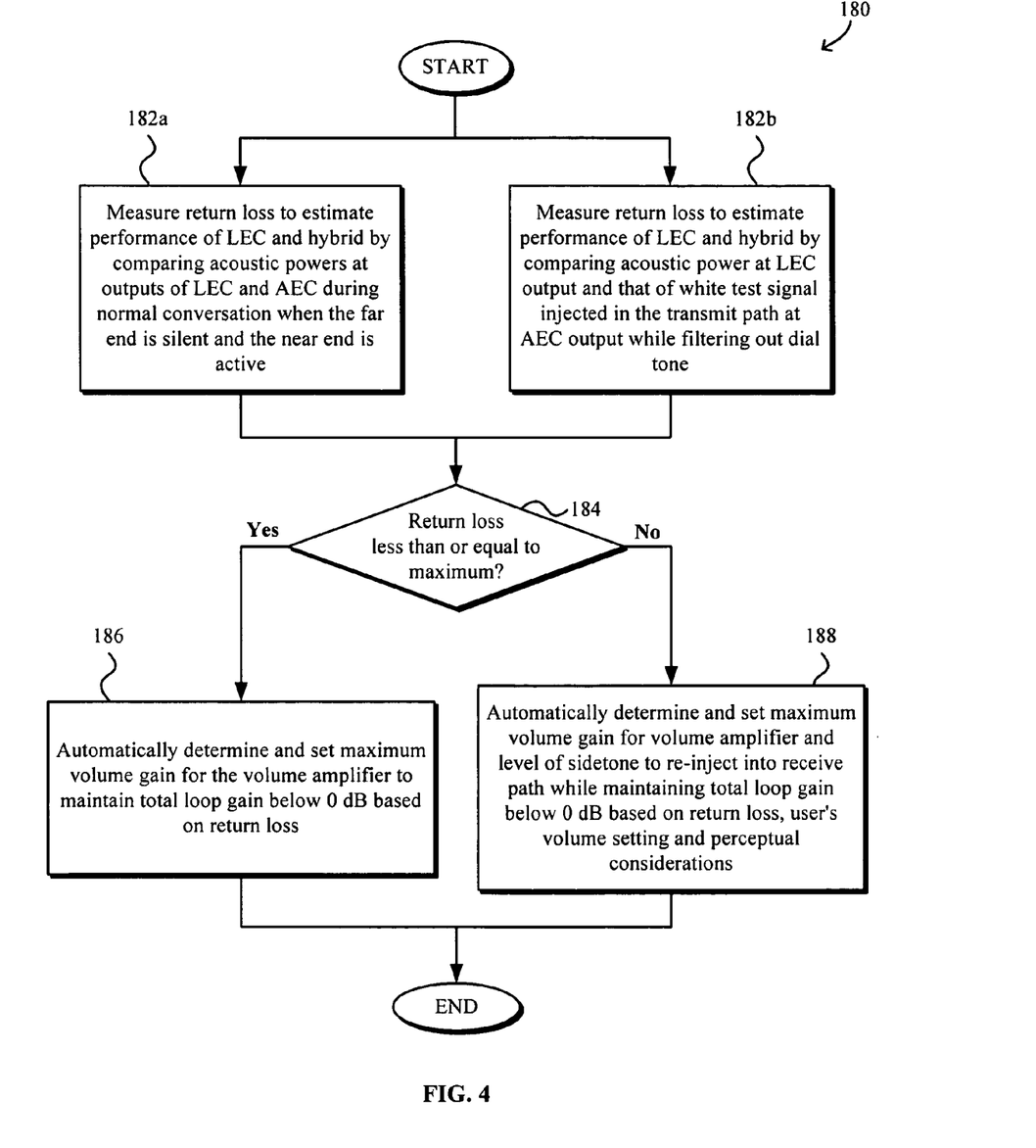
FIG. 4 is a flowchart illustrating a process for limiting the maximum gain and adapting the sidetone in an amplified telephone set such as one using a handset or headset for hearing impaired users.

FIG. 4 is a flowchart illustrating a process 180 for limiting the maximum gain and for adapting the sidetone in an amplified telephone set such as one using a handset or headset for hearing impaired users. At block 182, the maximum gain limiter of the telephone set's digital signal processor measures the total return loss (Loss_dB$_{Hyb}$+Loss_dB$_{LEC}$) to estimate the performance of the LEC and the hybrid. Blocks 182a and 182b may be similar to blocks 162a and 162b, respectively, as described above with reference to FIG. 3. If the total return loss is less than or equal to a predetermined maximum total return loss as determined at decision block 184, maximum gain limiter automatically determines and sets the maximum volume gain Gain_dB$_{Vol,Max}$ for the volume amplifier at block 186 based on the total return loss so that the total loop gain in the telephone set is maintained at below 0 dB to prevent unstable operation and howling. The maximum volume gain Gain_dB$_{Vol,Max}$ may then be used as the volume gain applied by the volume amplifier when the user sets the volume amplification on the maximum setting.

Alternatively, if the total return loss is greater than the predetermined maximum total return loss as determined at decision block 184, then the maximum gain limiter and the sidetone processor automatically determine and set the maximum volume gain Gain_dB$_{Vol,Max}$ for the volume amplifier and the level of sidetone Loss_dB$_{ST}$ to re-inject into the receive path at block 188, respectively. The determination at block 188 may be made based on the total return loss as determined at block 182 so that the total loop gain in the telephone set is maintained at below 0 dB to prevent unstable operation and howling as well as on the user's volume amplification setting and/or perceptual considerations, namely, to attempt to maintain a minimum level of sidetone when the total return loss exceeds the predetermined maximum.

The sound processing capabilities of the maximum gain limiter allow the telephone set to attain the highest volume gain $\text{Gain\_dB}_{Vol}$ for a particular local loop or connection to which the telephone set is connected while maintaining the total loop gain at below 0 dB and thus preventing or minimizing feedback or howling. In addition, the sound processing capabilities of the optional sidetone processor also allow the telephone set to maintain or attempt to maintain a minimum level of sidetone when the total return loss for the particular local loop to which the telephone set is connected is high for perceptual reasons. The optional sidetone processor thus also allows the amplified telephone set to better meet the individual hearing needs of users with varying degrees of hearing loss.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A duplex communications device, comprising:
   a receiver;
   a transmitter; and
   a digital signal processor having a receive path in communication with the receiver and a transmit path in communication with the transmitter, the digital signal processor including a volume amplifier for amplifying signals on the receive path at a volume amplification level and a maximum gain limiter for determining a total return loss between the receive and the transmit paths and for limiting the volume amplification level to a maximum depending on the total return loss.

2. The device of claim 1, wherein the total return loss varies depending on a connection with which the communications device is in communication.

3. The device of claim 1, wherein the maximum gain limiter is configured to determine the total return loss by maintaining a total loop gain for the device at less than 0 dB.

4. The device of claim 1, wherein the maximum gain limiter is configured to determine the total return loss based on a comparison between power of signals on the transmit path and power of signals on the receive path.

5. The device of claim 4, wherein the maximum gain limiter is configured to determine the total return loss based on output power of a line echo canceller on the receive path and output power of an acoustic echo canceller on the transmit path.

6. The device of claim 4, wherein the maximum gain limiter is configured to determine the total return loss during a communications call when a far end of the communications call is silent and the transmit path is active.

7. The device of claim 6, wherein the maximum gain limiter is configured to determine the total return loss at least one of once during each communications call and during a first communications call after the device is first powered up.

8. The device of claim 1, wherein the digital signal processor is configured to inject a test signal in the transmit path and wherein the maximum gain limiter is configured to determine the total return loss based on a comparison between power of signals on the receive path and power of the test signal.

9. The device of claim 8, wherein the maximum gain limiter is configured to determine the total return loss prior to a communications call when the device is off-hook and wherein maximum gain limiter is configured to filter out a dial tone on the receive path during the determining of the total return loss.

10. The device of claim 8, wherein the maximum gain limiter is configured to determine the total return loss at least one of once each time the device is off-hook and a first time the device is off-hook after the device is powered up.

11. The device of claim 1, wherein the digital signal processor further includes a sidetone processor configured to inject additional sidetone in the receive path depending on at least one of the total return loss between the receive and the transmit paths as determined by the digital signal processor, a predetermined minimum sidetone level, and a user volume level setting.

12. The device of claim 11, wherein the sidetone processor injects additional sidetone in the receive path when the total return loss is greater than a predetermined maximum total return loss.

13. The device of claim 11, wherein the sidetone processor and the maximum gain limiter maintain a total loop gain for the device at less than 0 dB.

14. The device of claim 1, wherein the duplex communications device is a telephone set.

15. A duplex communications device, comprising:
   a receiver in communication with a receive path;
   a transmitter in communication with a transmit path;
   a volume amplifier for amplifying signals on the receive path at a volume amplification level; and
   a maximum gain limiter for determining a total return loss between the receive and transmit paths and for limiting the volume amplification level to a maximum depending on the total return loss.

16. The device of claim 15, wherein the total return loss varies depending on a connection with which the communications device is communication.

17. The device of claim 15, wherein the maximum gain limiter is configured to determine the total return loss by maintaining a total loop gain for the device at less than 0 dB.

18. The device of claim 15, wherein the maximum gain limiter is configured to determine the total return loss based on a comparison between powers of signals on the transmit path and the receive path.

19. The device of claim 18, wherein the maximum gain limiter is configured to determine the total return loss based on output power of a line echo canceller on the receive path and output power of an acoustic echo canceller on the transmit path.

20. The device of claim 18, wherein the maximum gain limiter is configured to determine the total return loss during a communications call when a far end of the communications call is silent and the transmit path is active.

21. The device of claim 20, wherein the maximum gain limiter is configured to determine the total return loss at least one of once during each communications call and during a first communications call after the device is first powered up.

22. The device of claim 15, wherein the maximum gain limiter is configured to inject a test signal in the transmit path and wherein the maximum gain limiter is configured to determine the total return loss based on a comparison between power of signals on the receive path and power of the test signal.

23. The device of claim 22, wherein the maximum gain limiter is configured to determine the total return loss prior to a communications call when the device is off-hook and wherein maximum gain limiter is configured to filter out a dial tone on the receive path during the determining of the total return loss.

24. The device of claim 22, wherein the maximum gain limiter is configured to determine the total return loss at least one of once each time the device is off-hook and a first time the device is off-hook after the device is powered up.

25. The device of claim 15, further comprising a sidetone processor configured to inject additional sidetone in the receive path depending on at least one of: the total return loss as determined by the digital signal processor, a predetermined minimum sidetone level, and a user volume level setting.

26. The device of claim 25, wherein the sidetone processor injects additional sidetone in the receive path when the total return loss is greater than a predetermined maximum total return loss.

27. The device of claim 25, wherein the sidetone processor and the maximum gain limiter maintain a total loop gain for the device at less than 0 dB.

28. A method for maximizing amount of gain that can be applied to received signal of a duplex communications device so that a total loop gain for the device is less than 0 dB, comprising:
   measuring a total return loss between a receive and a transmit path of a digital signal processor of the device;
   automatically determining a maximum volume gain for a volume amplifier for amplifying signals at a volume amplification level on the receive path, the determining being dependent on the total return loss and performed by the digital signal processor; and
   limiting the volume amplification level to be applied by the volume amplifier on the receive path of the device to the maximum volume gain so that the total loop gain for the device is less than 0 dB.

29. The method of claim 28, wherein the total return loss varies depending on a connection with which the communications device is communication.

30. The method of claim 28, wherein the automatically determining includes maintaining a total loop gain for the device at less than 0 dB.

31. The method of claim 28, wherein measuring the total return loss includes comparing power of signals on the transmit path with power of signals on the receive path.

32. The method of claim 31, wherein measuring the total return loss is based on output power of a line echo canceller on the receive path and output power of an acoustic echo canceller on the transmit path.

33. The method of claim 31, wherein measuring the total return loss is performed during a communications call when a far end of the communications call is silent and the transmit path is active.

34. The method of claim 33, wherein measuring total the return loss is performed at least one of once during each communications call and during a first communications call after the device is first powered up.

35. The method of claim 28, wherein measuring the total return loss includes injecting a test signal in the transmit path and comparing power of signals on the receive path with power of the test signal.

36. The method of claim 35, wherein measuring total the return loss is performed prior to a communications call when the device is off-hook and wherein measuring the total return loss further includes filtering out a dial tone on the receive path during the measuring of the total return loss.

37. The method of claim 35, wherein the measuring the total return loss is performed at least one of once each time the device is off-hook and a first time the device is off-hook after the device is powered up.

38. The method of claim 28, further comprising automatically injecting an additional sidetone in the receive path by a sidetone processor depending on at least one of: the total return loss, a predetermined minimum sidetone level, and a user volume level setting.

39. The method of claim 38, wherein the injecting includes injecting additional sidetone in the receive path only when the total return loss is greater than a predetermined maximum total return loss.

40. The method of claim 38, wherein the injecting and the determining includes maintaining a total loop gain for the device at less than 0 dB.

* * * * *